Patented Feb. 25, 1941

2,233,343

UNITED STATES PATENT OFFICE 2,233,343

MANUFACTURE OF RUBY GLASS

Frank J. Dobrovolny, Ransomville, and Charles H. Lemke, Niagara Falls, N. Y., assignors to E. I. du Pont de Nemours & Company, Wilmington, Del., a corporation of Delaware No Drawing. Application March 10, 1939, Serial No. 261,070

7 Claims. (Cl. 106—36.1)

This invention relates to the manufacture of ruby glass, and more particularly to ruby glass in which copper is the colorant.

In the present specification and appended claims the term "ruby glass" is used to mean a glass composition which has a red color, including glass compositions in which the red color may be modified by the addition of other coloring materials. The term "copper ruby glass" is used to designate a ruby glass in which copper or a copper compound is used to impart the red color to the glass. Copper ruby glass is commonly made by adding copper or a copper compound to a conventional glass composition. Usually a small amount of stannous oxide or aluminum oxide or both is also added. It is also common practice to add to the batch a small amount of a reducing agent, for example, charcoal or a carbon-containing substance such as sugar or starch for the purpose of reducing the copper compound to the desired state and thereafter assisting in maintaining the copper compound in the proper state of reduction. Copper ruby glass articles, when blown or molded in the conventional manner, usually are substantially colorless or only slightly colored. However, after heating the articles in a lehr or open flame, for example, to a temperature of around 550 to 600° C., a red color will develop, the shade and intensity of the color depending largely on the amount of copper compound present and on the temperature and time of heating the article.

An object of the present invention is to provide an improved process for making copper ruby glass. A further object is to produce a copper ruby glass having an improved shade of color and a more uniform distribution of color than is ordinarily obtainable by methods known heretofore. A further object is to provide a copper ruby process in which a smaller amount of colorant is required than in the processes known heretofore. Other objects will be apparent hereinafter. Our invention also includes the novel copper ruby glass composition obtainable by our method.

The above stated objects may be attained in accordance with our invention by adding a small amount of a bismuth compound to a conventional copper ruby glass composition. We are aware that heretofore bismuth compounds have been added to various ceramic compositions for the purpose of opacifiers and the like, but in our process the amounts of bismuth compound used are ordinarily much less than those used heretofore and are of such small proportion that the effects obtained by the use of bismuth in prior methods are not apparent. In carrying out our process we add less than 1% of a bismuth compound, and in most cases an amount equivalent to less than 0.3% of bismuth oxide ($Bi_2O_3$) in the finished glass. The bismuth compound is incorporated in the glass melt either before or after the glass ingredients have been fused. Preferably, we mix the bismuth compound with the other glass making ingredients for making a copper ruby glass and fuse the mixture. For example, we may add from 0.02 to 0.2% or more of bismuth oxide or an equivalent amount of another bismuth compound to the glass batch before fusing.

We have discovered that the addition of bismuth to a conventional copper ruby glass batch has a marked and surprising effect in the color development when the glass articles are heated in the lehr or open flame. For example, in comparative tests we have demonstrated that in a glass batch containing no bismuth and containing insufficient copper to produce more than a very slight reddish tinge to the glass, the addition of bismuth to the same batch in a suitable amount will cause the formation of an excellent ruby color. In general, we have found that by means of our method, about one-half of the usual amount of copper may be employed, to produce a ruby color of the desired shade and quality. In similar comparative tests we have demonstrated that the addition of the same amount of bismuth to a crystal glass batch containing no copper results in a colorless crystal glass. Hence, it appears that the bismuth in itself does not act as a colorant in our process, but in some manner unknown to us it accelerates the development of the color caused by the presence of copper. The addition of the bismuth not only causes the formation of the desired color with a given amount of copper in the glass, but it usually also results in a more uniform distribution of the color.

In practicing our invention any conventional copper ruby glass batch may be utilized. For example, we have found that such glass batches may have a soda-lime base with or without the addition of potash, and likewise our invention may be used for making copper ruby glass having a borosilicate base. We have found, however, that variations in the base batch require modifications in the percentage of copper compound and bismuth compound used. It does not appear necessary to describe the various glass compositions which are suitable for making copper ruby glass, since these are well known to those skilled in glass making. Such known compositions are suitable for the application of our method.

In order to incorporate bismuth in the glass, we may add any suitable bismuth compound, for example, bismuth oxide, such as $Bi_2O_3$ or hydrates thereof, a bismuth salt, for example, the nitrate, subnitrate, sulfate, phosphate or carbonate. We prefer ordinarily not to use bismuth compounds which may affect the clarity or appearance of the glass, for example, halides and sulfides, although these may be used in most cases without deleterious effect, since the amount of the bismuth compound added is so small as to have little effect outside of the desired effect on the ruby color which we have discovered. If desired, other colorants beside the copper, or opacifying materials may be added to obtain special effects. We have found that the use of the bismuth does not depend upon any particular reducing agent used in connection with the copper ruby process. The various conventional carbonaceous reducing agents commonly employed in making copper ruby glass may be used in carrying out our invention, for example, sugar, starch, cellulose, charcoal, or organic compounds such as tartaric acid or tartrates. Other conventional addition agents for copper ruby glass also may be added to obtain the effects due to their presence, for example, aluminum oxide and a tin oxide, preferably stannic oxide. In practicing our invention we prefer to utilize the method of making copper ruby glass which is described and claimed in the copending patent application Serial No. 179,866, filed December 15, 1937, by Frank J. Dobrovolny, H. E. Klein, and J. M. Youel, now U. S. Patent 2,174,554.

The amount of bismuth to be added to the glass batch to produce copper ruby glass may vary, depending upon various factors, such as depth of color desired, the particular composition of the glass batch, the amount of copper colorant used and the degree of heat treatment after molding or blowing. The optimum amount of bismuth may be readily determined by simple trials. In general, excellent results may be obtained by adding such amount of bismuth or bismuth compound that the bismuth content of the finished glass corresponds to 0.01 to 0.3% of bismuth oxide ($Bi_2O_3$). In most cases, best results are obtained for the depth of ruby color usually desired when the bismuth content of the glass corresponds to 0.01 to about 0.04% by weight. For most practical purposes, in most cases the effect of the bismuth usually becomes small when the amount is decreased below 0.01% $Bi_2O_3$ in the finished glass, although smaller amounts of bismuth have an appreciable effect on the color developed. If too much of the bismuth compound is added the glass tends to acquire a dark brownish color which is usually undesired. In most cases such brownish color appears when the amount of bismuth is equivalent to more than 0.3% $Bi_2O_3$ in the finished glass. A good ruby color, without the formation of the brown color usually can be obtained if the amount of bismuth taken (calculated as $Bi_2O_3$) is not more than one-half the weight of copper (calculated as metallic copper) in the glass batch.

As an example of the practice of our invention, we may utilize our preferred modification of the herein described invention, adding to the glass batch, cuprous oxide, bismuth oxide or a suitable bismuth salt, e. g. the subnitrate, stannic oxide and sodium cyanide. These four ingredients are added to and mixed with conventional glass making ingredients such as silica, lime and soda ash. Various known formulas for making crystal glass of the soda-lime, borosilicate or other types may be utilized in this way. The four above named ingredients are mixed in and fused with the other ingredients of the formula chosen. Preferably they are added in the proportions indicated in the following tabulation, where the percentages are based on the weight of the finished glass composition:

| | Per cent by weight |
|---|---|
| Cuprous oxide ($Cu_2O$) | 0.05 to 0.2 |
| Bismuth oxide ($Bi_2O_3$) | 0.01 to 0.03 |
| Stannic oxide ($SnO_2$) | 0.1 to 0.2 |
| Sodium cyanide (NaCN) | 0.4 to 0.9 |

While the above named specific compounds of copper, bismuth, tin and cyanogen may be preferably used, their chemical equivalents may be used if desired. For example, the copper, tin or bismuth may be added as metals (preferably in finely divided form) or as oxides or salts. In place of sodium cyanide, other metal cyanides may be used, e. g. an alkali metal cyanide such as potassium cyanide, an alkaline earth cyanide, such as calcium cyanide or copper cyanide. Other metal cyanides may be used provided they do not adversely affect the desired color in the glass. Also other cyanogen compounds may be used in place of cyanide, as disclosed in the above mentioned copending application. However, the alkali metal cyanides are usually preferable.

We claim:

1. A ruby glass containing copper as red colorant and an amount of bismuth equivalent to an amount of $Bi_2O_3$ which is not more than one-half of the weight of metallic copper present and which does not exceed about 0.3% by weight of $Bi_2O_3$.

2. A ruby glass containing copper as red colorant and an amount of bismuth equivalent to about 0.01 to 0.3% by weight of $Bi_2O_3$.

3. A ruby glass containing 0.05 to 0.2% by weight of copper as red colorant and an amount of bismuth equivalent to about 0.01 to 0.3% by weight of $Bi_2O_3$.

4. A process for producing a ruby glass, which comprises fusing a mixture of glass making ingredients which contains copper in amount sufficient to impart a red coloration to the finished glass and an amount of bismuth equivalent to an amount of $Bi_2O_3$ which is not more than one-half of the weight of metallic copper present and which does not exceed about 0.3% by weight of $Bi_2O_3$.

5. A process for producing a ruby glass, which comprises fusing a mixture of glass making ingredients which contains copper in amount sufficient to impart a red coloration to the finished glass and an amount of bismuth equivalent to 0.01 to 0.3% by weight of $Bi_2O_3$.

6. A process for producing a ruby glass, which comprises fusing a mixture of glass-making ingredients which contains cyanide, copper in amount sufficient to impart a red coloration to the finished glass and an amount of bismuth equivalent to 0.01 to 0.3% by weight of $Bi_2O_3$.

7. A process for producing a mixture of glass making ingredients, which mixture contains the following ingredients in the amounts indicated, the percentages being based on the weight of the finished glass:

Copper, equivalent to 0.05 to 0.2% by weight of $Cu_2O$

Bismuth, equivalent to 0.01 to 0.03% by weight of $Bi_2O_3$

Tin, equivalent to 0.1 to 0.2% by weight of $SnO_2$

Cyanide, equivalent to 0.4 to 0.9% by weight of NaCn

FRANK J. DOBROVOLNY.
CHARLES H. LEMKE.